(12) United States Patent
Giogoli

(10) Patent No.: US 6,557,486 B2
(45) Date of Patent: May 6, 2003

(54) DEVICE FOR MOVING AND ORIENTING SPRAYING NOZZLES IN A COATING PAN

(75) Inventor: Antonio Giogoli, Bologna (IT)

(73) Assignee: G.S. S.r.l. Coating System, Bologna (IT)

( * ) Notice: Subject to any disclaimer, the term of this patent is extended or adjusted under 35 U.S.C. 154(b) by 0 days.

(21) Appl. No.: 10/031,535

(22) PCT Filed: May 16, 2001

(86) PCT No.: PCT/IB01/00872
§ 371 (c)(1),
(2), (4) Date: Mar. 19, 2002

(87) PCT Pub. No.: WO01/87497
PCT Pub. Date: Nov. 22, 2001

(65) Prior Publication Data
US 2002/0134303 A1 Sep. 26, 2002

(30) Foreign Application Priority Data
May 19, 2000 (IT) .................................. BO2000A0305

(51) Int. Cl.[7] .................................................. B05C 3/05
(52) U.S. Cl. ........................... 118/19; 118/24; 118/303; 118/313; 118/320; 118/418; 118/712

(58) Field of Search ............................... 118/712, 19, 24, 118/303, 313, 320, 418; 427/425, 424, 2.14

(56) References Cited

U.S. PATENT DOCUMENTS
2,380,758 A    7/1945  Hohl

FOREIGN PATENT DOCUMENTS
GB          858909       1/1961
JP          02045304     2/1990

*Primary Examiner*—Laura Edwards
(74) *Attorney, Agent, or Firm*—William J. Sapone; Coleman Sudol Sapone, P.C.

(57) ABSTRACT

A device moves and orients spraying nozzles (4) inside a coating pan (1). The spraying nozzles (4) are carried, arranged in a line, by a shaft (5), which rotates on a horizontal axis parallel to the axis of the rotating drum (1). The shaft (5) is supported by a support frame (7), which is fastened to a bar (10), which is rotated to adjust the distance between the spraying nozzles (4) and the free surface (20) of said mass of articles (2) being treated. The shaft (5) is fastened to the lever mechanism (16,17) of a positioning member (15) for changing the inclination of the spraying nozzles (4), so as to maintain constant their orientation with respect to said free surface (20) of the mass of articles (2).

8 Claims, 5 Drawing Sheets

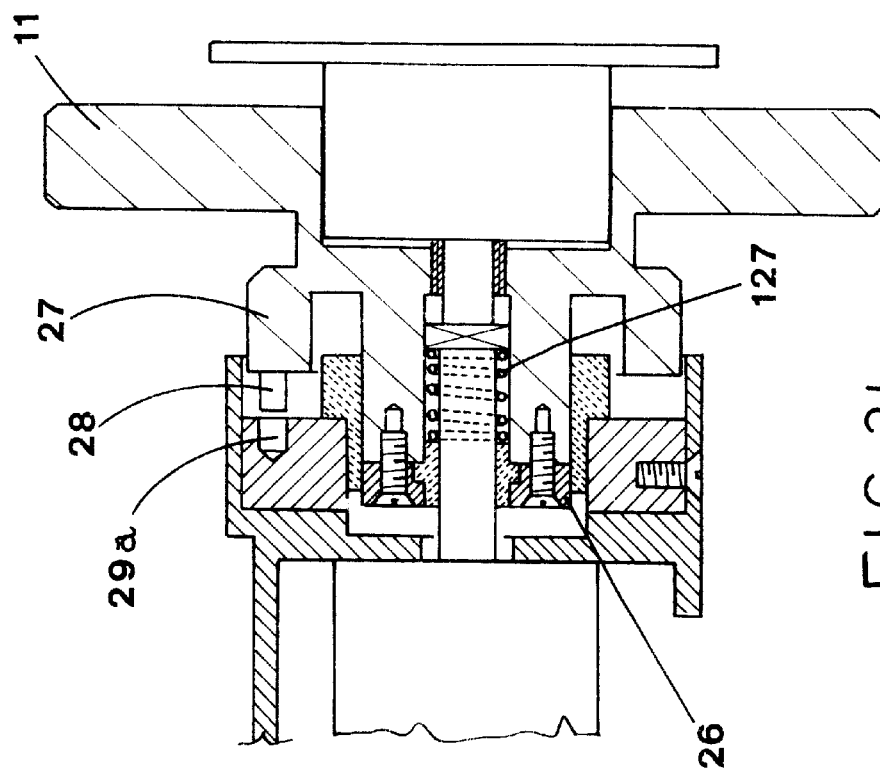
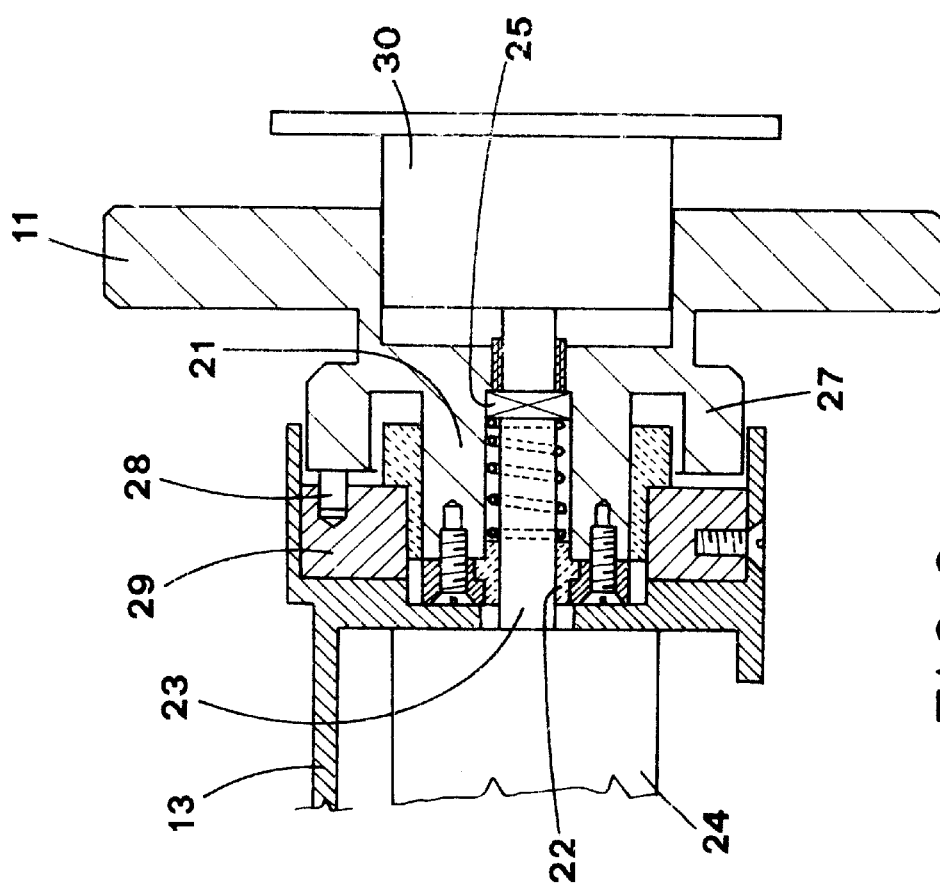

DEVICE FOR MOVING AND ORIENTING SPRAYING NOZZLES IN A COATING PAN

FIELD OF THE INVENTION

The present invention relates to machines for coating granular articles, such as pharmaceutical or confectionery products, with an outer layer.

More precisely, the invention relates to a device for moving and orienting the spraying nozzles in a coating pan of a machine for coating granular articles.

DESCRIPTION OF THE PRIOR ART

Currently, articles to be treated are coated in machines including a rotating drum, called coating pan, inside which the articles are introduced.

The coating pan is equipped with perforated hollow bodies, which extend from a manifold coaxial with the rotating drum, and which are immersed in the moving mass of articles to be treated.

A suitable liquid mixture is sprayed on the articles through nozzles, so as to form a protective coating.

Afterwards, a flow of hot air is sent into the articles mass, so as to dry the coating layer.

According to another use of the above mentioned machine, neutral granules are coated with mixtures of active principles and excipients, so as to form e.g. controlled release medicine pellets.

In this case, a predetermined quantity of neutral granules are introduced into the coating pan, so as to be covered, with help of a suitable binder, with layers of mixed powders containing active principles, and excipients.

The binder is introduced into the rotating drum by the spraying nozzles.

During the drum rotation, the appearance of the mass of granular articles changes in relation to different working parameters, e.g. rotation speed and physical characteristics of the articles, generally with the free surface inclined with respect to a horizontal plane.

Therefore, adjusting the position of the spraying nozzles correspondingly to the articles position is a problem that is encountered.

Actually, it is known that best results are obtained when the spraying nozzles are oriented substantially perpendicular to the free surface of the mass of the articles being coated, and at a predetermined distance therefrom.

It is also to be noted that during the production cycle, the volume of the granular articles changes, usually increases, due to the coating layer which settles thereon.

Consequently, the position of the spraying nozzles must be changed in relation to the changing position of the free surface of the granular articles.

In known machines, the position of the spraying nozzles can usually be adjusted manually, with the machine stopped, by acting inside the coating pan or after having removed the nozzles group therefrom.

It is obvious that such manual adjustment is not only difficult, but does not allow to intervene during the articles coating process.

This reduces considerably the efficiency of the coating process and does not allow to obtain best results in different situations.

SUMMARY OF THE INVENTION

The object of the present invention is to overcome the above problem by proposing a device which allows to move and locate the spraying nozzles by acting from outside the coating pan and during the granular articles coating process.

Another object of the present invention is to propose a device, which is very versatile in relation to the kind of liquid substance to be sprayed, and in particular, which can be used either for coating pharmaceutical or confectionery products with an outer protective layer, or coating the neutral granules with mixtures of active principles and excipients to obtain e.g. pharmaceutical pellets.

A further object of the present invention is to propose a device, whose construction is very simple and functional.

The above mentioned objects are obtained, in accordance with the claims, by a device for moving and orienting spraying nozzles in a coating pan, the coating pan including:

a rotating drum rotated on a first rotation axis for mixing a predetermined mass of articles being coated, said mass of article defining a free surface; and a group of spraying nozzles situated inside said rotating drum for spraying a liquid mixture for coating said articles;

said device being characterized by:

a bar supported inside said rotating drum and protruding partially outside said rotating drum;

a support frame, fastened to said bar and located inside said rotating drum;

a shaft rotatably supported by said support frame, said shaft being free to rotate on a second rotation axis parallel to said first rotation axis of said rotating drum;

a plurality of spraying nozzles carried, arranged in a line, by said shaft at a selected distance from said mass of articles being treated with a selected orientation with respect to said free surface of the mass of articles;

a positioning member having a lever mechanism connected to said shaft for changing inclination of said spraying nozzles and maintaining constant the orientation of said spraying nozzles with respect to said free surface of the mass of articles;

said bar being rotated to adjust said distance between said spraying nozzles and said free surface of said mass of articles being treated.

BRIEF DESCRIPTION OF THE DRAWINGS

The characteristic features of the present invention will be pointed out in the following description of a preferred, but not only embodiment, with reference to the enclosed drawings, in which:

FIGS. 3a and 3b are views of an enlarged particular of the proposed device, indicated with K in FIG. 3, in different working steps.

BEST MODES OF CARRYING OUT THE INVENTION

Figure 1:
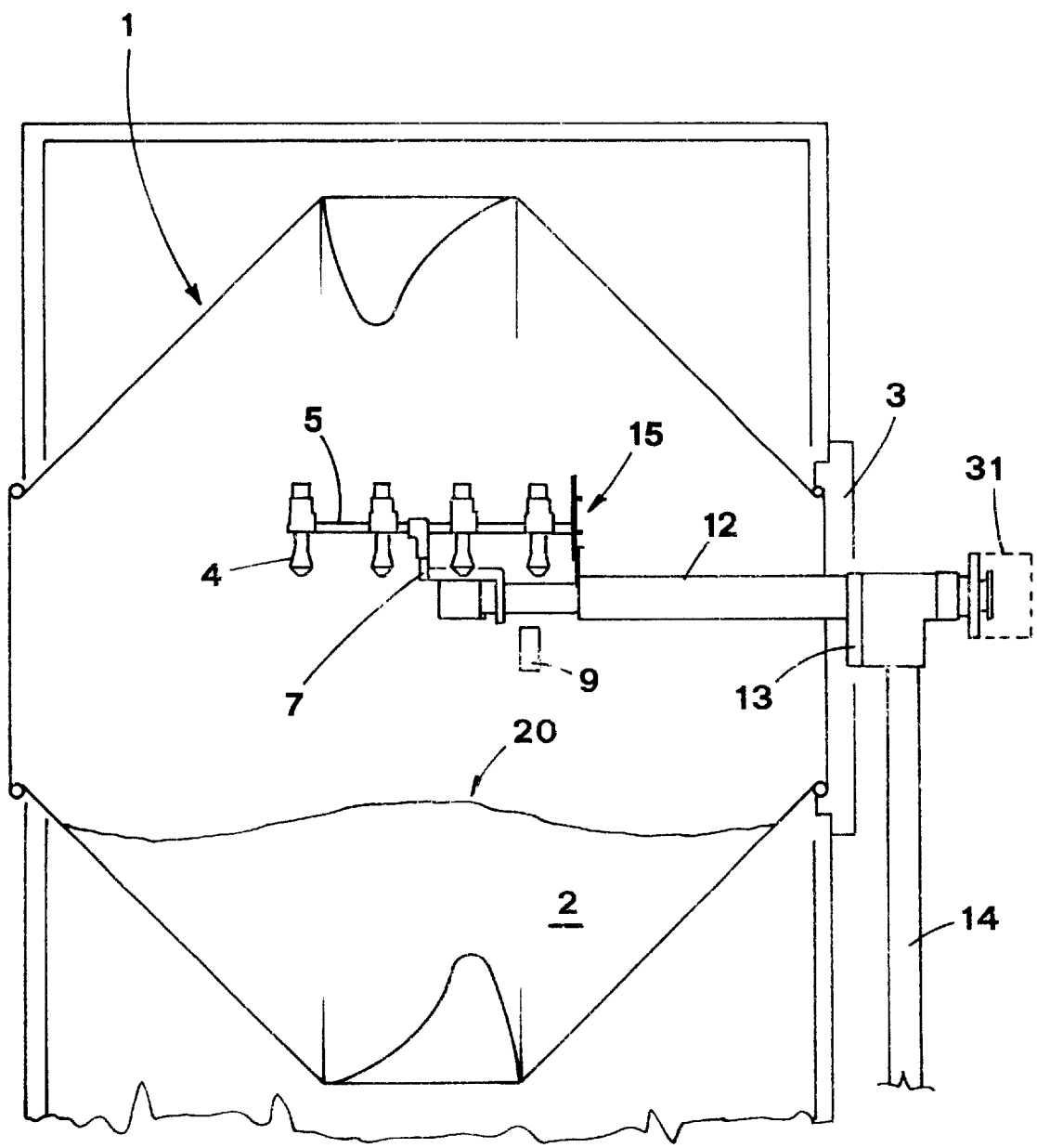
FIG. 1 is a schematic longitudinal section view of a coating pan of a machine for coating particulate articles, equipped with the proposed device for moving and orienting of the spraying nozzles.

With reference to the above figures, reference numeral 1 indicates a rotating drum, or coating pan, which receives particulate articles 2 to be treated.

The coating pan is formed e.g. by a central cylindrical part and two terminal truncated cone parts.

The coating pan 1 is rotatably carried by a stationary framework 2. The rotational axis of the coating pan is horizontal, and its front part features an opening 3 for introducing articles.

A tubular manifold, not shown for sake of clarity, is situated inside the coating pan 1, substantially coaxial with the coating pan.

The tubular manifold communicates with an outer pipe, through which the air for drying the treated articles passes.

A pair of perforated hollow bodies, not shown, extend from the manifold, so as to be dipped into the moving mass of the articles to be treated.

A group of spraying nozzles 4 is situated inside the coating pan 4, so as to spray the liquid mixture onto the articles to form a coating layer.

The spraying nozzles 4 are carried, arranged in line one beside another, by a horizontal shaft 5, which passes through a sleeve 6 and is free to rotate. The sleeve 6, which is integral with a support frame 7.

The support frame 7 is fastened to an arm 8, which extends, in a substantially radial position, from a bar 10, which adjusts the position of the nozzles 4.

The adjustment bar 10 is rotated, from outside the coating pan 1, by a handwheel 11, as will be explained later.

The adjustment bar 10 passes through a tube 12, whose axis is parallel to the bar 10 and to the axis of the coating pan 1, and protrudes from an end of the coating pan 1, in the region of the front surface of the opening 3.

Outside of the coating pan 1, the tube 12 is fastened to a support column 14 by a flange 13.

The other end of the tube 12, situated inside the coating pan 1, supports a member 15, which positions the group of spraying nozzles 4.

The positioning member 15 includes substantially a lever mechanism formed by first lever 16 and a second lever 17, hinged to each other by means of a pin 18.

Figure 2:
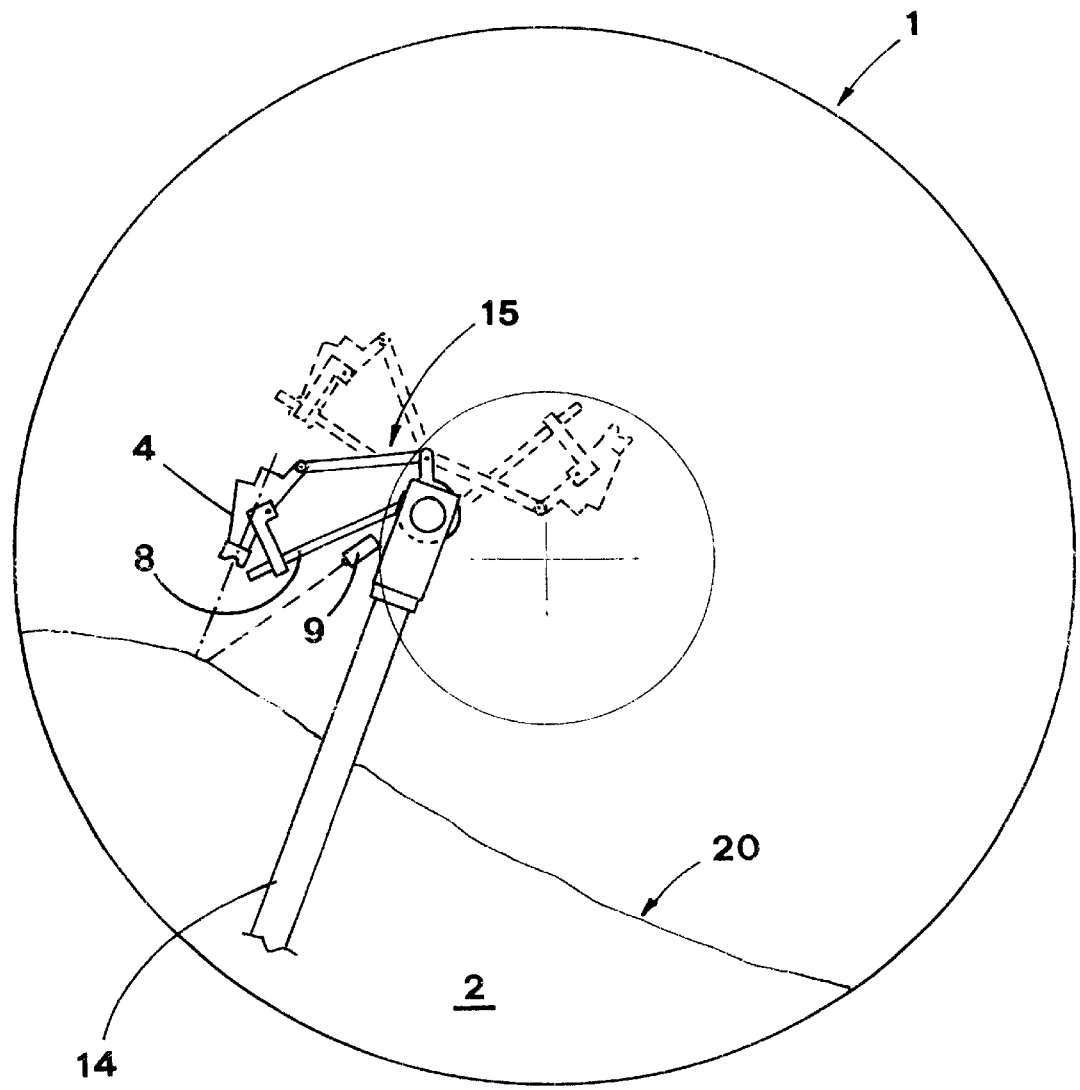
FIG. 2 is a cross-section view of the coating pan.
Figure 2A:
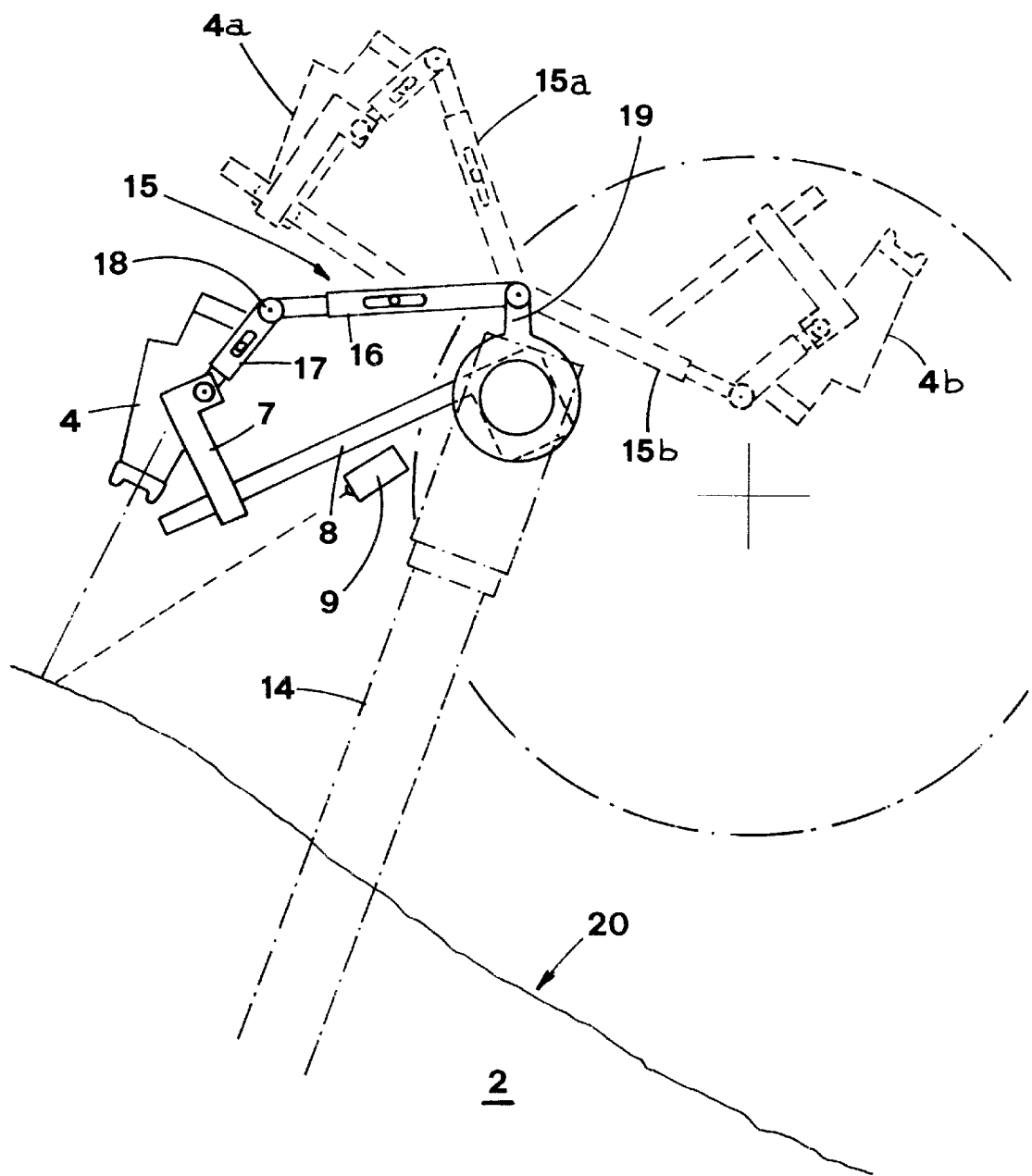
FIG. 2a is an enlarged view of a part of FIG. 2, to show better the proposed device for moving and orienting the spraying nozzles.

The first lever 16 is hinged to an annular disc 19 fixed to the tube 12, while the second lever 17 is integral with the shaft 5 of the spraying nozzles 4 (FIG. 2a).

Figure 3:
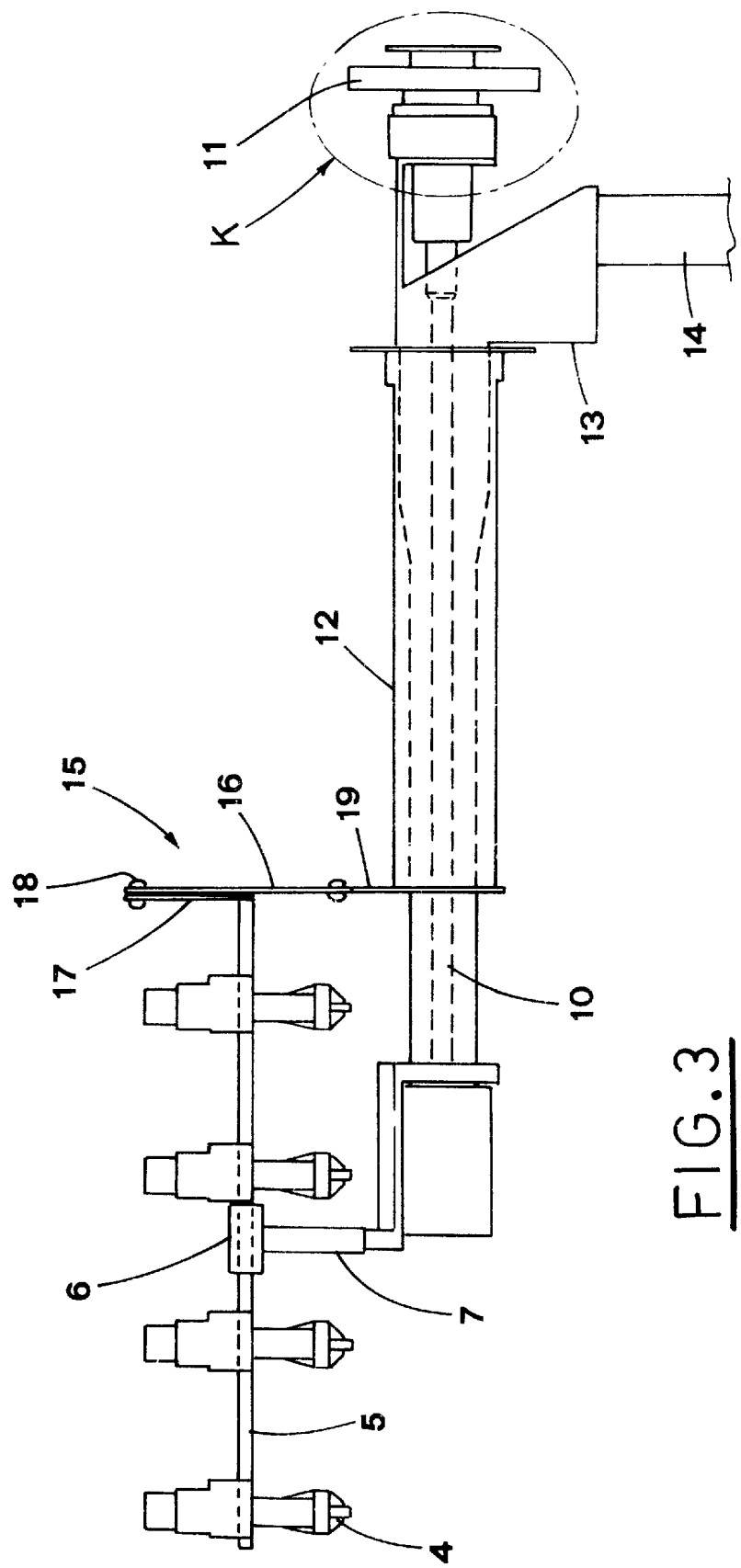
FIG. 3 is a lateral view of the device for moving and orienting the spraying nozzles.

As seen in detail in FIGS. 3a, 3b, the handwheel 11 is fastened to a tubular hub 21, which is slidingly fitted, by a bush 22, to an inlet shaft 23 of a reducer unit 24.

The hub 21 is coupled to the reducer unit 24 in the region of a prismatic head 25 of the inlet shaft 23.

At the outlet, the reducer unit 24 operates the bar 10 adjusting the position of the spraying nozzles 4.

The bush 22 is fastened to a ring 26, which is fixed to the front part of the hub 21 and acts as abutment for one end of a helical spring 127.

The other end of the helical spring 127 pushes the prismatic head 25.

The handwheel 11 has also an annulus 27 surrounding the hub 21, with a pin 28 protruding from the annulus.

The pin 28 can engage with one of a plurality of equidistant holes made in a disc 29 fastened to the flange 13 of the tube 12.

Therefore, when in a rest position, seen in FIG. 3a, the handwheel cannot rotate because the pin 28 is engaged with a hole of the motionless disc 29.

In order to rotate the handwheel 11, it is necessary to pull it, so as to make it slide axially against the action of the spring 127, until the pin 28 disengages from the hole 29a of the disc 29 (see FIG. 3b).

In this disengaged position, it is possible to rotate the handwheel 11 through a desired angle, thus rotating the inlet shaft 23 of the reducer unit 24 and consequently, the bar 10 of the device moving the nozzles 4.

Then, the handwheel 11 is brought back to the locked position, with the pin 28 engaged with a corresponding hole of the disc 29, due to the backward elastic reaction of the spring 127.

A transducer 30 is joined to the inlet shaft 23 to control the rotation imposed by the handwheel 11.

The proposed device includes also a sensor 9, which detects in real time the distance of the granular articles 2 from the free surface 20.

Therefore, the proposed device allows to move the group of spraying nozzles 4 from outside of the coating pan 1.

Actually, the rotation of the handwheel 11 drives the bar 10 into rotation.

The bar 10 carries the arm 8, on which the frame 7 supporting the nozzles 4 is mounted.

The movement of the support frame 7 determines the reciprocal rotation of the levers 16, 17 of the positioning member 15, as seen in FIG. 2a, where the reference numeral 4a indicates a different position of the spraying nozzles 4 and the numeral 15a indicates the position assumed correspondingly by the lever mechanism of the positioning member 15.

Actually, one end of the first lever 16 is hinged to a fixed point, while the second lever 17 is driven to follow the movement of the support frame 7.

The reciprocal rotation of the levers 16, 17 of the positioning member 15 determines a corresponding rotation of the shaft 5 of the spraying nozzles 4, which compensates for the opposite rotation determined by the movement of the arm 8, so as to maintain substantially the same orientation of the spraying nozzles 4 with respect to the free surface 20 of the mass of articles 2 to be treated.

Practically, by acting on the handwheel 11, it is possible to drive the spraying nozzles 4 from outside of the coating pan 1, during the coating of the granular articles 2, so as to maintain the spraying nozzles 4 at a constant distance from the free surface 20 of the articles 2 when the volume of the mass of articles 2 changes. This distance is detected in real time by the sensor 9.

At the same time, the lever mechanism of the positioning member 15 changes automatically the orientation of the spraying nozzles 4, so as to maintain constant the orientation thereof with respect to the free surface 20 of the mass of granular articles 2, in particular perpendicular to the free surface 20.

It is to be noted that, after the arm 8 carrying the frame 7 of the spraying nozzles 4 has performed rotation of a certain angle, the spraying nozzles 4 are turned over, as indicated with 4b in FIG. 2a.

The position assumed by the positioning member 15 is indicated with 15b in the same Figure.

This allows to position the group of spraying nozzles 4 in such a way that they can be removed from the coating pan 1.

Otherwise, the spraying nozzles 4 can be moved automatically by a special motor 31, mounted coaxially with the bar 10, as schematically shown in FIG. 1.

The motor 31 is controlled by known automatic programmable means, operated by the signal of the sensor 9.

Consequently, the proposed device allows to obtain best working conditions of the spraying nozzles inside a coating pan during coating of the granular articles, maintaining constant the distance between the spraying nozzles and the free surface of the mass of articles, or changing this distance in a programmed way in relation to different characteristics of the liquid substances to be sprayed.

What is claimed is:

1. A device for moving and orienting spraying nozzles in a coating pan, the coating pan including:

a rotating drum (1) rotated on a first rotation axis for mixing a predetermined mass of articles (2) being coated, said mass of articles defining a free surface; and a group of spraying nozzles (4) situated inside said rotating drum for spraying a liquid mixture for coating said articles (2);

said device being characterized by:

a bar (10) supported inside said rotating drum (1) and protruding partially outside said rotating drum (1);

a support frame (7), fastened to said bar (10) and located inside said rotating drum (1);

a shaft (5) rotatably supported by said support frame (7), said shaft (5) being free to rotate on a second rotation axis parallel to said first rotation axis of said rotating drum (1);

a plurality of spraying nozzles (4) carried, arranged in a line, by said shaft (5) at a selected distance from said mass of articles (2) being treated with a selected orientation with respect to said free surface (20) of the mass of articles (2);

a positioning member (15) having a lever mechanism (16,17) connected to said shaft (5) for changing inclination of said spraying nozzles (4) and maintaining constant the orientation of said spraying nozzles (4) with respect to said free surface (20) of the mass of articles (2);

said bar (10) being rotated to adjust said distance between said spraying nozzles (4) and said free surface (20) of said mass of articles (2) being treated.

2. A device, according to claim 1, further including a sensor (9) aimed at detecting, in real time, the distance between said spraying nozzles (4) and the free surface (20) of said mass of granular articles (2).

3. A device, according to claim 1, wherein said lever mechanism (16,17) of the positioning member (15) includes a first lever (16) hinged at one end to a fixed point and a second lever (17) hinged at one end to said first lever (16) and at the other end, integral with said shaft (5) of the spraying nozzles (4).

4. A device, according to claim 1, wherein said bar (10) is rotated by a motor (31), controlled by a sensor (9), which detects, in real time, the distance between said spraying nozzles (4) and the free surface (20) of said mass of granular articles (2).

5. A device, according to claim 1, wherein said bar (19) is rotated by a handwheel (11) situated outside said coating pan (1).

6. A device, according to claim 5, wherein said handwheel (11) is equipped with a tubular hub (21), which is slidingly mounted on an inlet shaft (23) of a reducer unit (24), so as to transmit motion to said bar (10), said hub (21) being coupled to said inlet shaft (23) by prismatic means (25), so as to move between a locked position and an axial pulling position, in which the handwheel (11) is allowed to rotate, said locked position being determined by engaging of coupling means (28), carried by said handwheel (11), with corresponding holes made in a motionless disc, due to the push of elastic means (127), and said axial pulling position being determined by disengagement of the coupling means (28) against the action of said elastic means (127).

7. A device, according to claim 1, wherein said support frame (7) is fastened in an adjustable position, to an arm (8), which extends, in a substantially radial position, from said bar (10) adjusting the nozzles (4) position.

8. A device, according to claim 1, wherein said bar (10) for adjusting the nozzles (4) position passes through a motionless tube (12), whose axis is parallel to the axis of the coating pan (1), and protrudes from one end of said coating pan (1), said tube (12) acting as a support for said positioning member (15) inside said coating pan (1).

* * * * *